Patented May 9, 1939

2,157,332

UNITED STATES PATENT OFFICE 2,157,332

DECOMPOSITION OF SUBSTANCES CONTAINING TUNGSTEN SULPHIDE

Paul Herrmann Gericke, Hans Heinrich v. Baumbach, and Fritz Berndt, Leuna, Germany, assignors to I. G. Farbenindustrie Aktiengesellschaft, Frankfort-on-the-Main, Germany No Drawing. Application August 13, 1936, Serial No. 95,844. In Germany August 17, 1935

11 Claims. (Cl. 23—22)

The present invention relates to a process for the decomposition of substances containing tungsten sulphide.

The decomposition of such substances, as for example catalyst resides from destructive hydrogenations, is usually effected by first removing the sulphur by roasting and then carrying out a treatment with aqueous alkaline solvents. For certain purposes it is necessary to select aqueous ammonia as the alkaline solvent. According to the statements in the pertinent literature (see Gmelins "Handbuch der anorganischen Chemie", 8th edition, Volume on Wolfram, page 120, 1933) tungsten trioxide is, however, after heating to 500° C. practically insoluble in aqueous ammonia without the use of pressure. A complete roasting of tungsten sulphide at temperatures below 500° C., however, requires a very well-built and carefully attended roasting plant and is rather expensive.

We have now found that contrary to expectation in the decomposition of substances containing tungsten sulphide the tungsten trioxide formed by roasting at temperatures above 500° C. can be brought into solution in a simple manner by treating the roasted mass for a long time, for instance 2 to 20 hours, preferably 6 to 12 hours, with aqueous ammoniacal solutions, which if desired may also contain a little ammonium sulphide, at atmospheric pressure, preferably at elevated temperature and while stirring vigorously. It is specially advantageous to lead uninterruptedly or periodically ammonia and if desired also hydrogen sulphide in during the said dissolution process. The tungsten trioxide formed dissolves to the extent of more than 90% per cent even if the temperatures during the roasting have amounted to 1000° C. or more for long periods.

The new method of dissolving tungsten trioxide thus renders it possible to employ for the roasting of the sulphide a simple plant not requiring careful supervision as regards temperature and which is therefore economical.

The following examples will further illustrate the nature of this invention but the invention is not restricted to these examples.

Example 1

140 kilograms of tungsten sulphide contaminated iron sulphide, tar and coally constituents and having a grain size of from 10 to 15 millimetres are charged to a shaking height of 40 centimetres into an iron chest covered with asbestos. The bottom and cover of the chest consist of sieve plates in order to provide an inlet for air at the bottom and an outlet for the gases from the roasting at the top. The roasting is initiated by heating for 20 minutes from the bottom and is completed in 4 days without supervision. From a zone in which the temperature has been above 1000° C. for 14 hours, a sample of 50 grams is withdrawn and, after appropriate comminution (sieving 900 meshes per square centimetre), is treated with 200 cubic centimetres of 10 per cent ammonia solution at from 80° to 85° C. while stirring and leading ammonia through. After 6 hours, 92 per cent of the tungsten has passed into solution.

Example 2

1100 kilograms of tungsten trioxide, which has been prepared by roasting tungsten sulphide at from 600° to 1200° C., are treated with 3.3 cubic metres of an ammoniacal liquor containing about 10 per cent of $NH_3$ and about 9 per cent of $H_2S$ while stirring well and leading in ammonia. After heating for 12 hours at from 65° to 75° C., 90 per cent of the tungsten trioxide have been dissolved.

What we claim is:

1. A process for the decomposition of substances containing tungsten sulphide which comprises roasting the said substances at temperatures above 600° C. and treating the roasted mass for a period of at least two hours at atmospheric pressure with aqueous ammoniacal solutions and for a sufficient period of time to dissolve a major portion of the tungsten oxide.

2. The process as claimed in claim 1 which comprises leading ammonia during the treatment with aqueous ammoniacal solutions into these solutions.

3. The process as claimed in claim 1 which comprises leading ammonia uninterruptedly during the treatment with aqueous ammoniacal solutions into these solutions.

4. The process as claimed in claim 1 which comprises leading ammonia periodically during the treatment with aqueous ammoniacal solutions into these solutions.

5. The process as claimed in claim 1 which comprises having present a little ammonium sulphide in the aqueous ammoniacal solution.

6. The process as claimed in claim 1 which comprises using an aqueous solution of ammonia and incorporating therein a little ammonium sulphide.

7. The process as claimed in claim 1 which comprises using an aqueous ammoniacal solution and leading in hydrogen sulphide during the treatment with the said solution.

8. The process as claimed in claim 1 which comprises using an aqueous ammoniacal solution and leading in hydrogen sulphide uninterruptedly during the treatment with the said solution.

9. The process as claimed in claim 1 which comprises using an aqueous ammoniacal solution and leading in hydrogen sulphide periodically during the treatment with the said solution.

10. In the process as claimed in claim 1, performing the treatment with aqueous ammoniacal solutions at a raised temperature.

11. In the process as claimed in claim 1, performing the treatment with aqueous ammoniacal solutions, while stirring vigorously.

PAUL HERRMANN GERICKE.
HANS HEINRICH v. BAUMBACH.
FRITZ BERNDT.